(12) United States Patent
Lear et al.

(10) Patent No.: US 11,015,945 B2
(45) Date of Patent: May 25, 2021

(54) PROVIDING INFORMATION REGARDING RELEVANT POINTS OF INTEREST

(71) Applicant: Telogis Inc., Aliso Viejo, CA (US)

(72) Inventors: Peter J. Lear, Hamilton (CA); Victor J. Rehorst, Whitby (CA); Weiyu Liang, Richmond Hill (CA); Elizabeth A. Burgess, Toronto (CA)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 135 days.

(21) Appl. No.: 15/908,073

(22) Filed: Feb. 28, 2018

(65) Prior Publication Data

US 2019/0265058 A1    Aug. 29, 2019

(51) Int. Cl.
*G01C 21/34* (2006.01)
*G01C 21/36* (2006.01)

(52) U.S. Cl.
CPC ..... *G01C 21/3476* (2013.01); *G01C 21/3679* (2013.01)

(58) Field of Classification Search
None
See application file for complete search history.

(56) References Cited

U.S. PATENT DOCUMENTS

| 8,095,303 | B1* | 1/2012 | Nesbitt | G01C 21/3476 |
| | | | | 340/988 |
| 2008/0208461 | A1* | 8/2008 | Gharsalli | G01C 21/32 |
| | | | | 701/425 |
| 2011/0071758 | A1* | 3/2011 | Cho | G01C 21/3682 |
| | | | | 701/431 |
| 2013/0069941 | A1* | 3/2013 | Augui | G01C 21/20 |
| | | | | 345/419 |
| 2018/0143030 | A1* | 5/2018 | Kwon | G01C 21/3614 |

* cited by examiner

*Primary Examiner* — Todd Melton
*Assistant Examiner* — Jason R Roberson

(57) ABSTRACT

A device can determine route information associated with a route of a vehicle, identify a point of interest (POI) based on the route information, and identify a portion of the route that has a shortest distance to the POI. The device can determine one or more paths from the POI, and determine whether the portion of the route is included in an initial portion of a path of the one or more paths. The device can determine whether the POI is located to a right of the portion of the route, and perform one or more actions to cause the route information and information regarding the POI to be provided to a user device associated with the vehicle based on whether the portion of the route is included in the initial portion of the path, and whether the POI is located to the right of the portion of the route.

20 Claims, 9 Drawing Sheets

US 11,015,945 B2

PROVIDING INFORMATION REGARDING RELEVANT POINTS OF INTEREST

BACKGROUND

Certain points of interest (POIs), such as road signs and weigh stations or scales, can be useful to drivers. Some navigation devices alert drivers to POIs that are upcoming along or near vehicle routes.

DETAILED DESCRIPTION OF PREFERRED EMBODIMENTS

The following detailed description of example implementations refers to the accompanying drawings. The same reference numbers in different drawings can identify the same or similar elements.

Navigation service providers typically provide drivers (e.g., via user devices, such as in-vehicle navigation devices, which might take the form of vehicle built-in navigational devices or smart phones with navigational applications used within a vehicle) information regarding POIs on a route of a vehicle. However, in many cases, the POIs might not be easily/quickly reachable from the route of the vehicle, for example, without traveling a significant distance (e.g., a POI might be located under/over a ramp of a roadway that requires a driver to make multiple turns or maneuvers to reach after exiting the roadway), or might not be within a range of visibility of a driver of the vehicle (e.g., might not be located on the right side of or to the right of the road, which, in countries where vehicles are driven on the right-hand side of two-way roads, would be closer to the driver). Additionally, in some cases, certain POIs, such as road signs, might not be applicable to the route of the vehicle. For example, a road sign might only be applicable to the other side of a two-way road (opposite the direction of travel of the vehicle) or might only be applicable to a different road located near the route of the vehicle, and thus would be of little or no use to the driver.

Some implementations, described herein, include a notification platform that is capable of determining whether a POI, located along or near a route of a vehicle, satisfies one or more conditions (e.g., is easily/quickly reachable from the route and is, or would be, within a range of visibility of a driver of the vehicle), and providing information regarding the POI (e.g., for display to the driver) if the POI satisfies the condition(s). In this way, a navigation service provider can avoid providing, to a driver, information regarding a POI that might be irrelevant to the driver or that might take an unreasonable amount of time to reach (or involve an unreasonable driving distance to reach) from the route of the vehicle, which conserves communication resources of the device, reduces or eliminates a need for an in-vehicle navigation device to store and process information regarding such a POI (which conserves processing and memory resources of the navigation device), and conserves energy (e.g., fuel) that would otherwise need to be expended to reach a POI that is a significant driving distance away from the route. Additionally, this reduces a quantity of alerts provided to a driver, which reduces a quantity of distractions to the driver, permitting the driver to be more focused on the road (thereby improving the safety of the driver and others on the road).

Figure 1A:
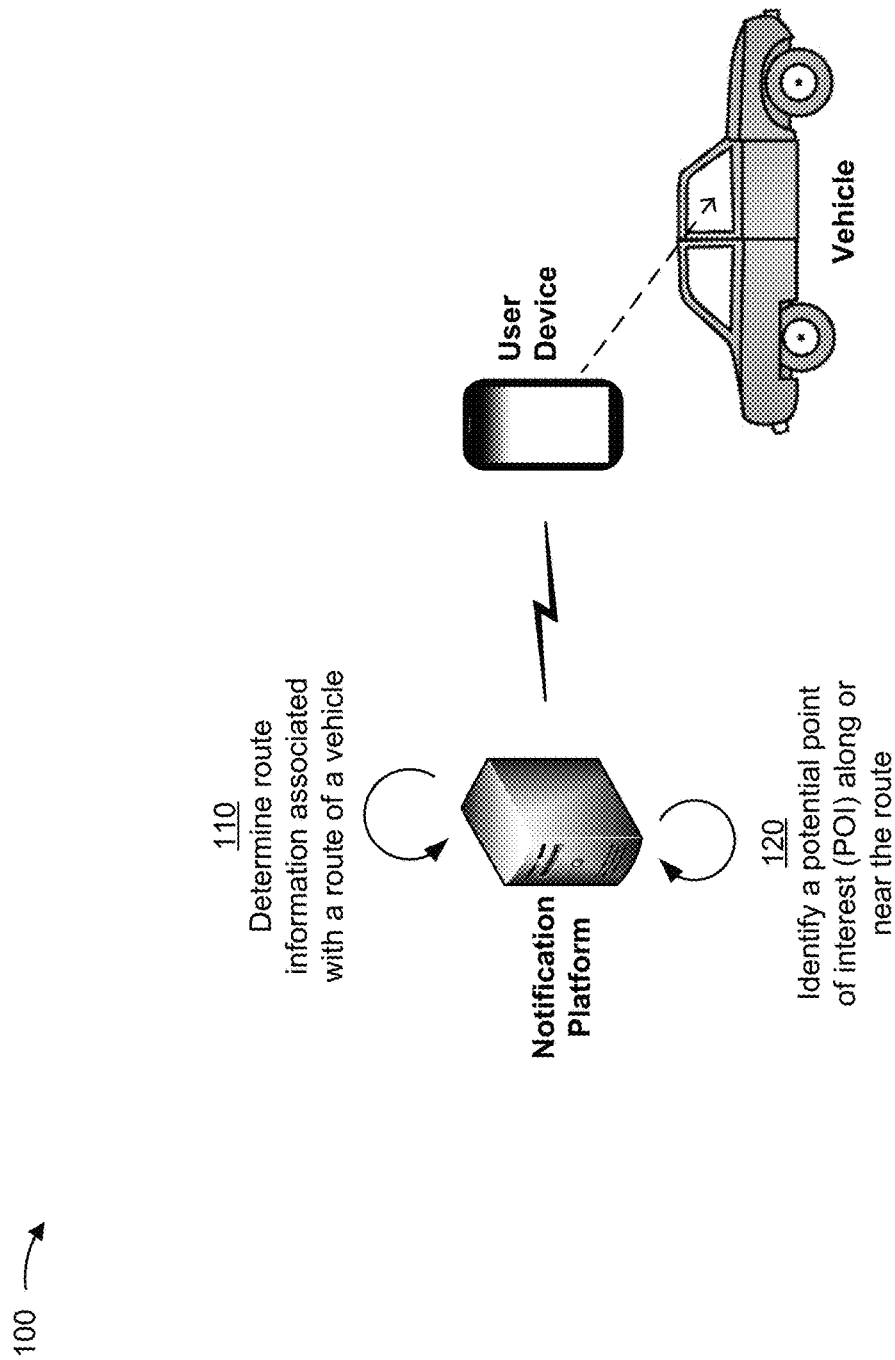
FIGS. 1A-1C are diagrams of an overview of an example implementation described herein.
Figure 1B:
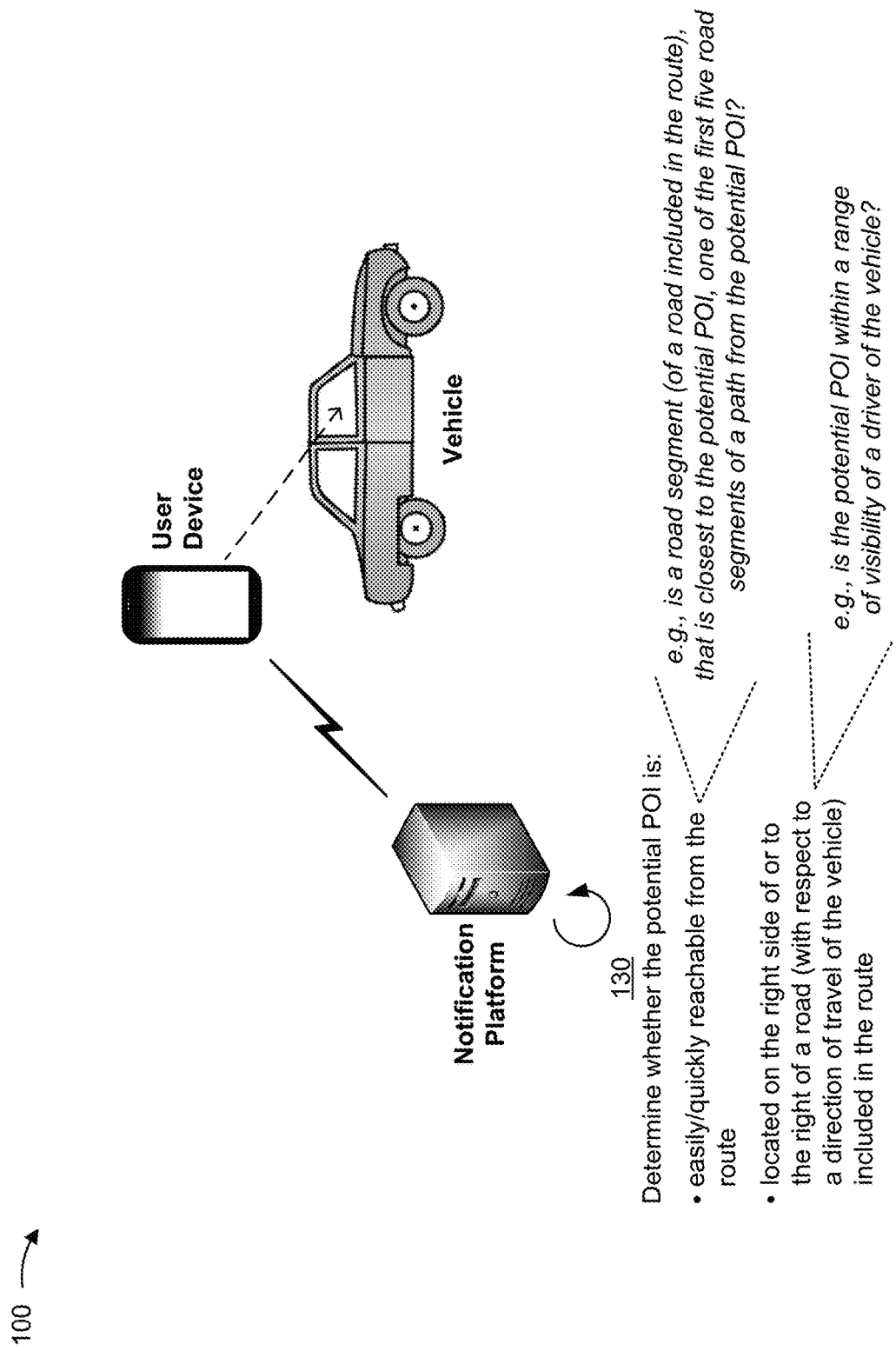
Figure 1C:
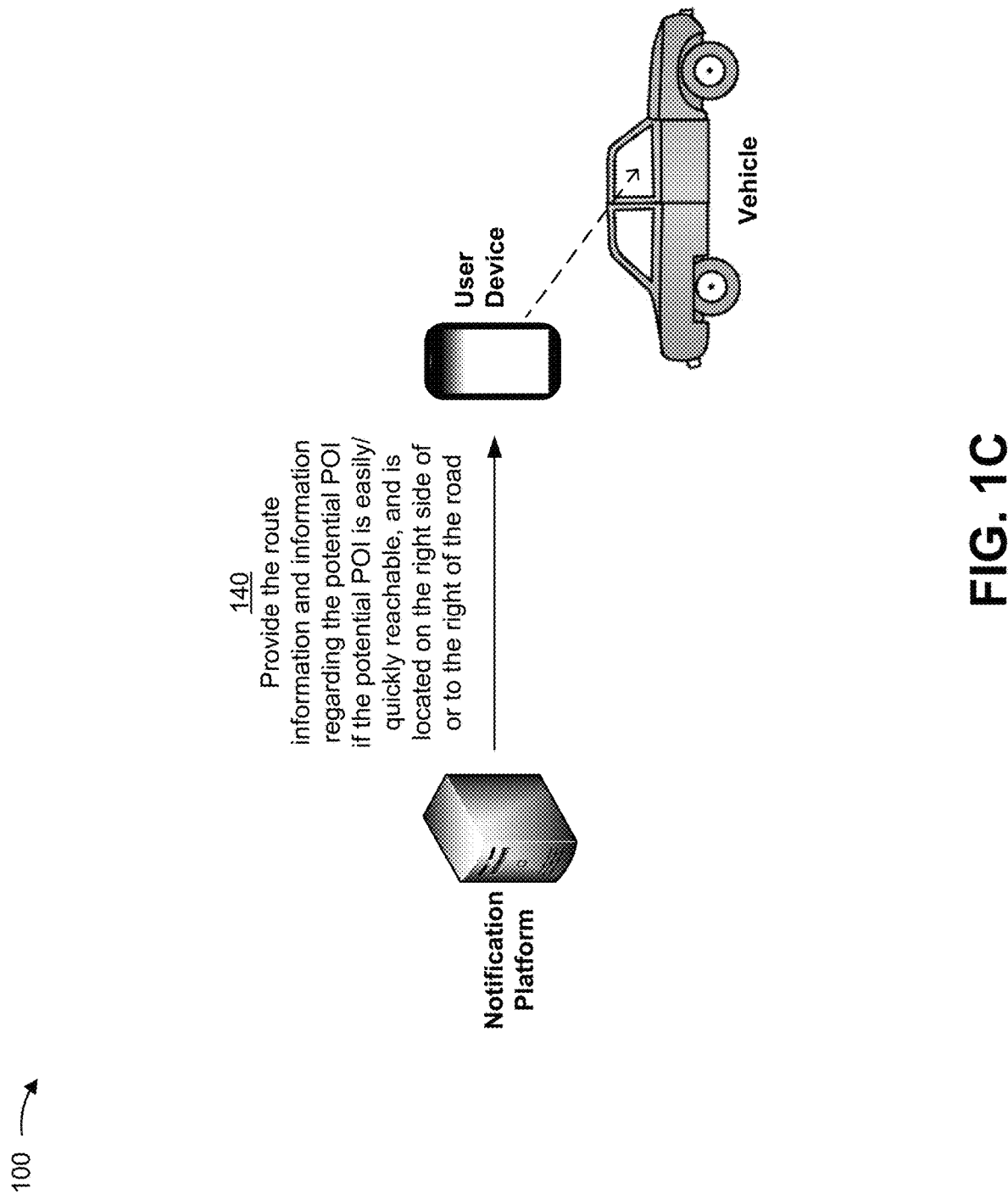

FIGS. 1A-1C are diagrams of an overview of an example implementation 100 described herein. As shown in FIGS. 1A-1C, example implementation 100 can include a notification platform and a user device (e.g., a navigation device) located within a vehicle. The notification platform can be in communication with the user device.

As shown in FIG. 1A, and by reference number 110, the notification platform can determine route information (e.g., information that identifies roadways, segments of roadways, etc.) for a vehicle. For example, the notification platform can determine the route information based on information associated with a planned route for the vehicle, based on location information associated with the user device and/or the vehicle, based on a predicted route for the vehicle, and/or the like.

As shown by reference number 120, the notification platform can identify a potential POI (e.g., a road sign (e.g., a rollover sign, a steep hill or downgrade sign, a speed limit sign, a sharp curve sign, and/or the like), a weigh station or scale, a landmark, a business establishment, etc.) along or near a route of the vehicle corresponding to the route information. In some implementations, the notification platform can identify the potential POI by performing one or more lookup searches (e.g., for POIs located proximate to (along or near) the route of the vehicle) based on one or more trace points of a trace of the route of the vehicle—a route trace. In some implementations, the notification platform can identify the potential POI based on one or more user preferences (e.g., preferences of a driver of the vehicle, preferences of a subscriber (e.g., a subscriber of navigation services provided by the notification platform) associated with the vehicle, and/or the like). In some implementations, the notification platform can identify a potential POI based on data stored in the notification platform and/or in another device (e.g., a server device, another platform, and/or the like).

As shown in FIG. 1B, and by reference number 130, the notification platform can determine whether the potential POI is easily/quickly reachable from the route of the vehicle, and whether the potential POI is located on the right side of or to the right of a road (with respect to a direction of travel of the vehicle) included in the route of the vehicle (and thus is, or would be, within a range of visibility of a driver of the vehicle).

In some cases, a road can be divided into multiple road segments (e.g., based on intersections and/or other attribute(s)). In such cases, the notification platform can determine whether the potential POI is easily/quickly reachable from the route of the vehicle by comparing road segments of roads included in the route of the vehicle and road segments of roads included in one or more paths from the potential POI. Here, as shown, for example, the notification platform can determine whether the potential POI is easily/quickly reachable from the route of the vehicle by determining whether a road segment, of a road included in the route of the vehicle, that is closest to the potential POI (e.g., a portion, of the route of the vehicle, having a shortest distance to the potential POI), is one of the first five road segments of a path from the potential POI.

In some implementations, the notification platform can determine whether the potential POI is located on the right side of or to the right of the road by determining whether the potential POI is, or would be, within a range of visibility of the driver. In some implementations, the notification platform can perform the determination by identifying a route trace (not shown), identifying a trace point in the route trace that is closest to (having a shortest distance to) the potential POI (e.g., by calculating distances between the potential POI and various trace points in the route trace, as described elsewhere herein), utilizing other trace points in the route trace to determine a bearing of the route trace at the closest trace point (e.g., based on a virtual line (e.g., having a length that satisfies (e.g., exceeds) a threshold, such as 200 meters and/or the like) between a trace point in the route trace that precedes the closest trace point and a trace point in the route trace that follows the closest trace point, as described elsewhere herein), and comparing a bearing of a side vector (e.g., a side vector from the closest trace point to the potential POI) and the bearing of the route trace at the closest trace point. For example, in a case where a trace point P in a route trace is the closest trace point to the potential POI, where a bearing of the route trace at trace point P is 0 degrees (north), and where a bearing of a side vector from trace point P to the potential POI is anywhere from 0 degrees to 180 degrees, for example, the notification platform can determine that the potential POI is located on the right side of or to the right of the road (e.g., is, or would be, within a range of visibility of the driver).

As shown in FIG. 1C, and by reference number 140, the notification platform can provide the route information and information regarding the POI to the user device (e.g., for display). For example, in a case where the notification platform determines that the potential POI is located on the right side of or to the right of the road and is easily/quickly reachable from the route of the vehicle, as described herein, the notification platform can determine that the potential POI is relevant, and can provide the route information and the information regarding the POI to the user device. The user device can then present the information regarding the POI, for example, as an alert, when the vehicle is within a threshold distance from the POI.

In this way, a navigation service provider can avoid providing, to a driver, information regarding a POI that might be irrelevant to the driver or that might take an unreasonable amount of time to reach (or involve an unreasonable driving distance to reach) from the route of the vehicle, which conserves communication resources of the device, reduces or eliminates a need for an in-vehicle navigation device to store and process information regarding such a POI (which conserves processing and memory resources of the navigation device), and conserves energy (e.g., fuel) that would otherwise need to be expended to reach a POI that is a significant driving distance away from the route. Additionally, this reduces a quantity of alerts provided to a driver, which reduces a quantity of distractions to the driver, permitting the driver to be more focused on the road (thereby improving the safety of the driver and others on the road).

As indicated above, FIGS. 1A-1C are provided merely as examples. Other examples are possible and can differ from what was described with regard to FIGS. 1A-1C. Although, in some implementations described herein, the notification platform can provide information regarding a potential POI if two conditions—i.e., that the POI is easily/quickly reachable from a route of a vehicle, and that the POI is located on the right side of or to the right of the road—are satisfied, other implementations are possible. For example, the notification platform can provide information regarding a potential POI if only one of the conditions is satisfied (e.g., regardless of the other one being satisfied).

Figure 2:
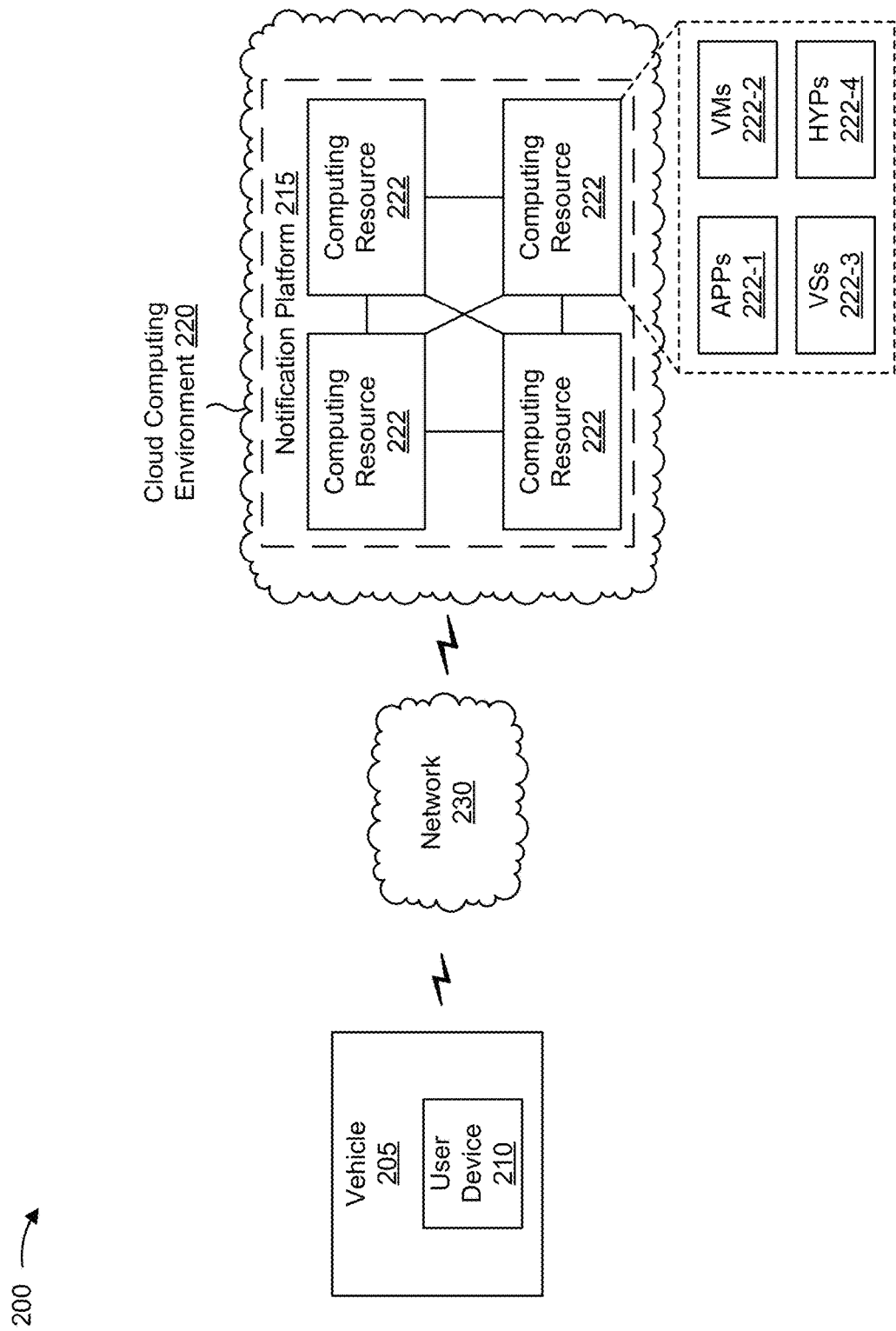
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a vehicle 205, a user device 210, a notification platform 215 (e.g., hosted in a cloud computing environment 220), and a network 230. Devices of environment 200 can interconnect via wired connections, wireless connections, or a combination of wired and wireless connections.

Vehicle 205 includes a mobile machine (e.g., that transports people and/or cargo). For example, a vehicle can include a motor vehicle (e.g., a motorcycle, a bus, a car, a truck, etc.), a railed vehicle (e.g., a train or a tram), a watercraft (e.g., a ship, a boat, a submarine, etc.), an aircraft (e.g., a plane, a glider, or an unmanned aerial vehicle (UAV)), a spacecraft, an electric vehicle (e.g., an electric car or truck), a moped, a scooter, a bicycle, and/or the like. In some implementations, a vehicle can include an autonomous vehicle, such as an autonomous car, an autonomous boat, and/or the like. In some implementations, vehicle 205 can include user device 210 (e.g., user device 210 can be a device that is mounted in, attached to, or a part of vehicle 205).

User device 210 includes one or more devices capable of receiving, generating, storing, processing, and/or providing information associated with vehicle 205 and/or notification platform 215. For example, user device 210 can include a communication and computing device, such as a mobile phone (e.g., a smart phone, a radiotelephone, etc.), a tablet computer, a handheld computer, a wearable communication device (e.g., a smart wristwatch, a pair of smart eyeglasses, etc.), a device integrated in vehicle 205 (e.g., a touch screen device included in vehicle 205), a navigation system of vehicle 205, or a similar type of device.

Notification platform 215 includes one or more devices capable of receiving, generating, storing, processing, and/or providing information associated with vehicle 205 and/or user device 210. Notification platform 215 can include a server device or a group of server devices. In some implementations, as shown, notification platform 215 can be hosted in cloud computing environment 220. Notably, while implementations described herein describe notification platform 215 as being hosted in cloud computing environment 220, in some implementations, notification platform 215 is not cloud-based or can be partially cloud-based.

Cloud computing environment 220 includes an environment that delivers computing as a service, whereby shared resources, services, etc. can be provided to user device 210. Cloud computing environment 220 can provide computation, software, data access, storage, and/or other services that do not require end-user knowledge of a physical location and configuration of a system and/or a device that delivers the services. As shown, cloud computing environment 220 can include a set of computing resources 222.

Computing resource 222 includes one or more personal computers, workstation computers, server devices, or another type of computation and/or communication device. In some implementations, computing resource 222 can host notification platform 215. The cloud resources can include compute instances executing in computing resource 222, storage devices provided in computing resource 222, data transfer devices provided by computing resource 222, etc. In some implementations, computing resource 222 can communicate with other computing resources 222 via wired connections, wireless connections, or a combination of wired and wireless connections.

As further shown in FIG. 2, computing resource 222 can include a group of cloud resources, such as one or more applications ("APPs") 222-1, one or more virtual machines ("VMs") 222-2, virtualized storage ("VSs") 222-3, one or more hypervisors ("HYPs") 222-4, and/or the like.

Application 222-1 includes one or more software applications that can be provided to or accessed by user device 210. Application 222-1 can eliminate a need to install and execute the software applications on user device 210. For example, application 222-1 can include software associated with notification platform 215 and/or any other software capable of being provided via cloud computing environment 220. In some implementations, one application 222-1 can send/receive information to/from one or more other applications 222-1, via virtual machine 222-2.

Virtual machine 222-2 includes a software implementation of a machine (e.g., a computer) that executes programs like a physical machine. Virtual machine 222-2 can be either a system virtual machine or a process virtual machine, depending upon use and degree of correspondence to any real machine by virtual machine 222-2. A system virtual machine can provide a complete system platform that supports execution of a complete operating system ("OS"). A process virtual machine can execute a single program, and can support a single process. In some implementations, virtual machine 222-2 can execute on behalf of a user (e.g., user device 210), and can manage infrastructure of cloud computing environment 220, such as data management, synchronization, or long-duration data transfers.

Virtualized storage 222-3 includes one or more storage systems and/or one or more devices that use virtualization techniques within the storage systems or devices of computing resource 222. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 222-4 provides hardware virtualization techniques that allow multiple operating systems (e.g., "guest operating systems") to execute concurrently on a host computer, such as computing resource 222. Hypervisor 222-4 can present a virtual operating platform to the guest operating systems, and can manage the execution of the guest operating systems. Multiple instances of a variety of operating systems can share virtualized hardware resources.

Network 230 includes one or more wired and/or wireless networks. For example, network 230 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
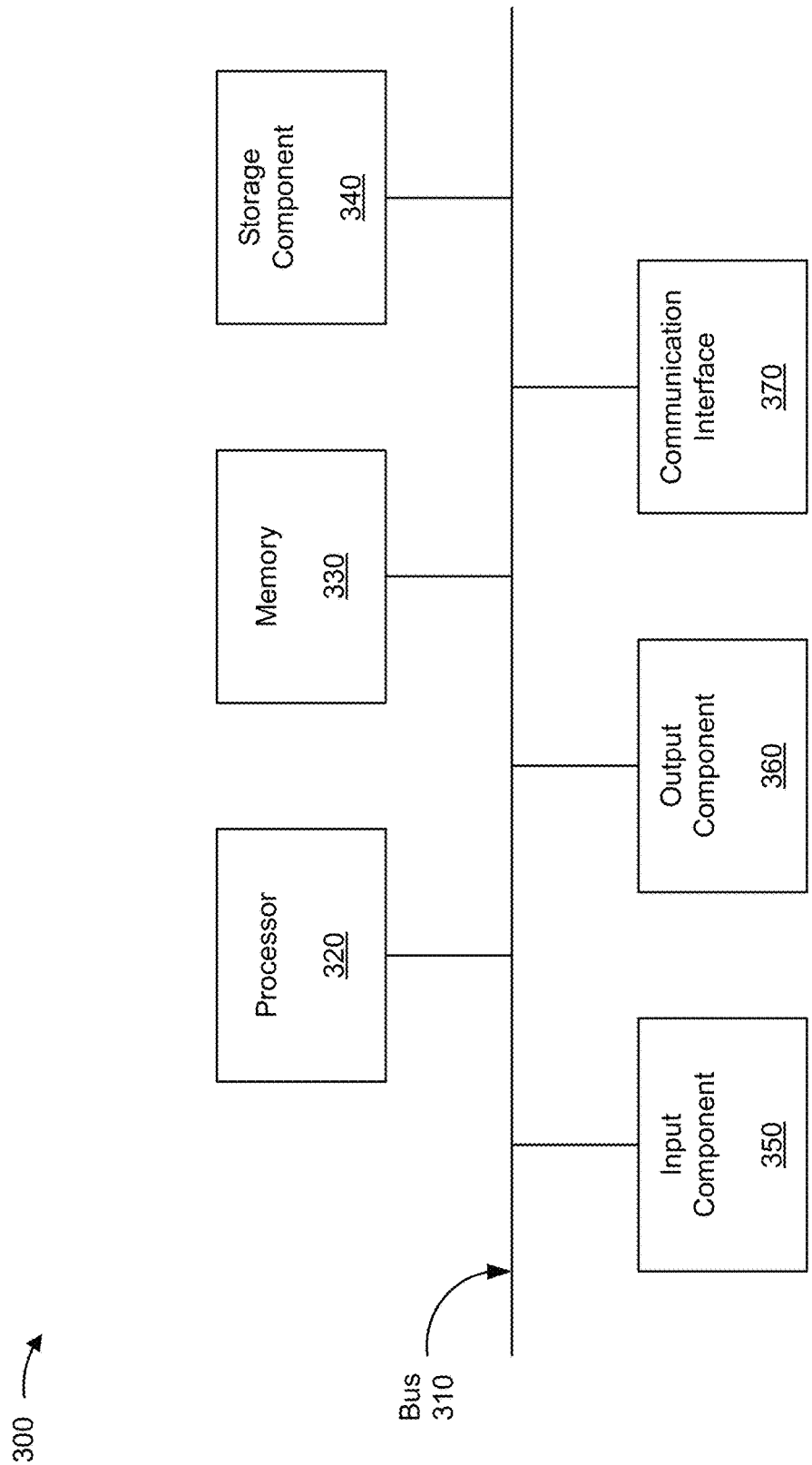
FIG. 3 is a diagram of example components of one or more devices of FIG. 2.

FIG. 3 is a diagram of example components of a device 300. Device 300 can correspond to vehicle 205, user device 210, and/or notification platform 215. In some implementations, vehicle 205, user device 210, and/or notification platform 215 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, and/or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
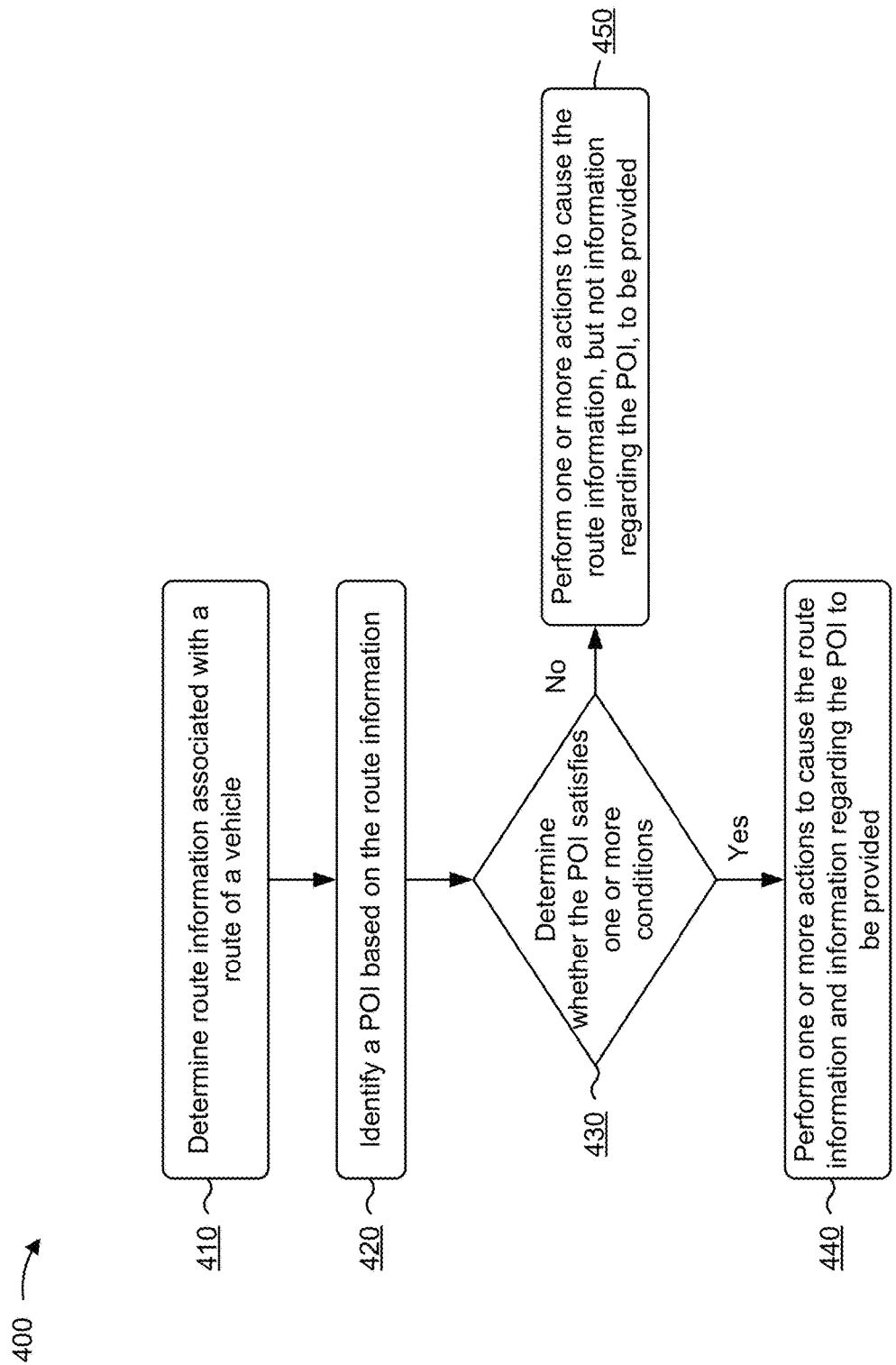
FIG. 4 is a flow chart of an example process for providing information regarding relevant POIs.

FIG. 4 is a flow chart of an example process 400 for providing information regarding relevant points of interest. In some implementations, one or more process blocks of FIG. 4 can be performed by notification platform 215. In some implementations, one or more process blocks of FIG. 4 can be performed by another device or a group of devices separate from or including notification platform 215, such as user device 210.

As shown in FIG. 4, process 400 can include determining route information associated with a route of a vehicle (block 410). For example, notification platform 215 can determine (e.g., using processor 320, communication interface 370, and/or the like) route information associated with a route of vehicle 205. In practice, notification platform 215 can perform thousands, millions, billions, etc. of determinations relating to route information for hundreds, thousands, etc. of vehicles 205. In this way, notification platform 215 can perform determinations relating to route information in a manner that cannot be performed manually or objectively by a human actor. In some implementations, the route information can include information that identifies one or more roads or roadways on which vehicle 205 is being driven or is expected to be driven, one or more road segments of the one or more roads or roadways (e.g., information that identifies one or more portions of the one or more roads or roadways), and/or the like.

In some implementations, notification platform 215 can determine the route information based on information associated with a planned route. The planned route can include, for example, a route from a particular starting location (e.g., a current location of user device 210 and/or vehicle 205) to a particular destination (e.g., a location identified based on user input to user device 210). In some implementations, the information associated with the planned route can be determined by a mapping service with a route planning capability (e.g., a mapping service provided by notification platform 215, user device 210, or another device). In a case where the mapping service is provided by user device 210 or another device, notification platform 215 can determine the route information based on receiving the information associated with the planned route (e.g., when the information associated with the planned route is provided (e.g., automatically) to notification platform 215, when the information associated with the planned route is provided to notification platform 215 based on user input, and/or the like).

Additionally, or alternatively, notification platform 215 can determine the route information based on location and/or heading information associated with user device 210 and/or vehicle 205. For example, notification platform 215 can determine (e.g., based on information provided by user device 210 and/or vehicle 205) information that identifies a current location of vehicle 205 (e.g., a set of GPS coordinates and/or the like) and information that identifies a direction of travel of vehicle 205 (e.g., based on directional information provided by user device 210 and/or vehicle 205, based on locations of user device 210 and/or vehicle 205 at different times, and/or the like).

Continuing the example, and in some implementations, notification platform 215 can identify (e.g., based on the location information and information stored or accessible by notification platform 215) a roadway on which vehicle 205 is currently driving, and can determine the route information based on information that identifies the roadway and information that identifies the direction of travel of vehicle 205. In this example, the route information can include information that identifies a portion of the identified roadway in the direction of travel (e.g., when notification platform 215 is configured to assume that vehicle 205 will continue driving on the identified roadway in the identified direction). In some implementations, notification platform 215 can update (e.g., periodically, based on detecting a change in the direction of travel, and/or the like) and/or revise the route information.

Additionally, or alternatively, notification platform 215 can determine the route information based on information associated with a predicted route of vehicle 205. In some implementations, the information associated with the predicted route can be determined based on information associated with user device 210 and/or vehicle 205, such as a current location of user device 210 and/or vehicle 205, a current direction of travel of vehicle 205, a current time of day, a current day of the week, information associated with historical routes (e.g., a previous planned route, a previous predicted route, and/or the like) associated with user device 210 and/or vehicle 205, information that identifies historical locations of user device 210 and/or vehicle 205 at different times of day on different days of the week, and/or the like.

For example, notification platform 215 can have access to a route prediction model that receives, as input, information associated with the current location of user device 210 and/or vehicle 205, a current direction of travel of vehicle 205, the current time of day, and the current day of the week. Here, the route prediction model can compare the information associated with the current location, the current direction of travel, the current time of day, and the current day of the week and the information associated with historical routes associated with user device 210 and/or vehicle 205, and determine the information associated with the predicted route based on the comparison. As a particular example, notification platform 215 can identify a historical route for which the current location, the current direction of travel, the current time of day, and the current day of the week match (e.g., or are within threshold(s) of) corresponding information associated with the historical route, and can determine the information associated with the predicted route based on the historical route.

Additionally, or alternatively, notification platform 215 can determine the information associated with the predicted route based on information provided by another device, such as user device 210 and/or a device associated with a mapping service (e.g., when the other device is configured with the route prediction capability).

In this way, notification platform 215 can determine route information associated with a route of a vehicle to cause notification platform 215 to identify a POI based on the route information.

As further shown in FIG. 4, process 400 can include identifying a POI based on the route information (block 420). For example, notification platform 215 can identify (e.g., using processor 320, memory 330, storage component 340, and/or the like) a POI based on the route information. In some implementations, notification platform 215 can identify multiple POIs based on the route information. In practice, notification platform 215 can identify thousands, millions, billions, etc. of POIs based on route information. In this way, notification platform 215 can identify POIs based on route information in a manner that cannot be performed manually or objectively by a human actor.

The POI can be a location, an object, and/or the like that might be of interest to a user (e.g., a driver) of vehicle 205 while on the route. For example, the POI can be a road sign (e.g., a rollover sign, a steep hill or downgrade sign, a speed limit sign, a sharp curve sign, and/or the like), a weigh station or scale, a landmark, a business establishment, and/or the like.

In some implementations, notification platform 215 can identify the POI from data sets stored in notification platform 215 (e.g., in memory associated with, or accessible to, notification platform 215). Additionally, or alternatively, notification platform 215 can identify the POI from data sets stored in another device, such as a POI data server and/or the like.

In some implementations, notification platform 215 can identify the POI based on determining (e.g., from one or more lookup searches) that the POI is located proximate to (along or near) the route identified by the route information, as described elsewhere herein (e.g., with respect to FIGS. 1A-1C above).

In some implementations, notification platform 215 can determine updated information regarding POIs when, for example, notification platform 215 determines updated route information (e.g., when notification platform 215 determines route information for an updated route prediction, when notification platform 215 determines that vehicle 205 changes roadways and/or directions, when notification platform 215 determines route information for an additional or a different planned route, and/or the like).

In this way, notification platform 215 can identify a POI based on the route information to cause notification platform 215 to determine whether the POI satisfies one or more conditions.

As further shown in FIG. 4, process 400 can include determining whether the POI satisfies one or more conditions (block 430). For example, notification platform 215 can determine (e.g., using processor 320, memory 330, storage component 340, and/or the like) whether the POI satisfies one or more conditions. In practice, notification platform 215 can perform thousands, millions, billions, etc. of determinations relating to POIs. In this way, notification platform 215 can perform determinations relating to POIs in a manner that cannot be performed manually or objectively by a human actor.

In some implementations, the one or more conditions can include a condition that the POI is easily or quickly reachable from the route identified by the route information. In some cases, roads can be represented as segments—road segments—that are each associated with a unique value (e.g., a unique identifier or ID). In such a case, notification platform 215 can determine a road segment, of a road included in the route of the vehicle, that is closest to (e.g., the portion of the route that is the shortest in distance from) the POI—i.e., the closest road segment. Additionally, notification platform 215 can determine one or more paths (e.g., all the paths) from the POI, identify, for each such path, a set of initial road segments from the POI (e.g., an initial portion starting from the POI, such as the first four road segments of the path from the POI, the first five road segments of the path from the POI, the first six road segments of the path from the POI, and/or the like), and determine whether any of such set(s) of initial road segments includes the closest road segment. In a case where notification platform 215 determines that the closest road segment is included in one or more of the set(s) of initial road segments from the POI, notification platform 215 can determine that the POI satisfies the condition. Otherwise, notification platform 215 can determine that the POI does not satisfy the condition.

Additionally, or alternatively, and in some implementations, the one or more conditions can include a condition that the POI is located within a range of visibility of a driver of the vehicle (e.g., vehicle 205)—that is, a condition that the POI is located on an appropriate side (with respect to a direction of travel of the vehicle) of a road included in a route of the vehicle (e.g., located on a side (a right side or a left side), of a portion of the route (e.g., of a road included in the route), that corresponds to a side of two-way roads (the right side or the left side) on which vehicles are driven. For example, in geographic regions, such as in the United States, where vehicles are driven on the right side of two-way roads, the condition can be that the POI is located on the right side of or to the right of a portion of the route (e.g., to the right of the road, where a driver might be better able to view the POI). As another example, in geographic regions, such as in the United Kingdom, where vehicles are driven on the left side of two-way roads, the condition can be that the POI is located on the left side of or to the left of a portion of the route (e.g., to the left of the road, where a driver might be better able to view the POI). For simplicity of description, various implementations are described herein with respect to cases where vehicles are driven on the right side of two-way roads. However, it is to be understood that the implementations described herein apply equally, or similarly, in cases where vehicles are driven on the left side of two-way roads.

In some implementations, notification platform 215 can identify a trace of points (e.g., each associated with an index value) in the route of the vehicle—a route trace, and calculate a bearing (e.g., an expected bearing or direction of travel of the vehicle, such as vehicle 205) associated with one or more (e.g., all) of such trace points. In some implementations, the bearing can be a value in degrees relative to north (e.g., where north corresponds to 0°, east corresponds to 90°, south corresponds to 180°, and west corresponds to 270°).

In some implementations, and as an example, notification platform 215 can, for a given trace point $P_N$, calculate a distance (e.g., a displacement) between a trace point having an index value that precedes the index value (N) of trace point $P_N$ by x*n (e.g., where x and n are integers, and where x is initially set to 1) (i.e., a trace point $P_{N-n}$) and a trace point having an index value that is ahead of the index value (N) of trace point $P_N$ by x*n (i.e., a trace point $P_{N+n}$), and determine whether the calculated distance satisfies a threshold (e.g., is greater than or equal to a predefined distance, such as 100 meters, 200 meters, and/or the like). In some implementations, the value n, the value x, and the threshold can be set or configured by a user (e.g., a system administrator), another platform or device (e.g., a management device), and/or the like. The threshold can be set to a value that accounts for curvatures in the road (e.g., which can affect the proper determination of bearing values).

In some implementations, and in a case where the calculated distance does not satisfy the threshold (e.g., is not greater than or equal to the predefined distance), notification platform 215 can calculate a distance between a trace point having an index value that precedes the index value (N) of trace point $P_N$ by x*n (where x, here, is incremented by 1, e.g., x=2) (i.e., a trace point $P_{N-2n}$) and trace point $P_{N+n}$, and determine whether the calculated distance satisfies the threshold (e.g., is greater than or equal to the predefined distance). In some implementations, and in a case where the calculated distance still does not satisfy the threshold (e.g., is not greater than or equal to the predefined distance), notification platform 215 can calculate a distance between trace point $P_{N-2n}$ and a trace point having an index value that is ahead of the index value (N) of trace point $P_N$ by x*n (where x, here, is incremented by 1, e.g., x=2) (i.e., a trace point $P_{N+2n}$), and determine whether the calculated distance satisfies the threshold (e.g., is greater than or equal to the predefined distance). In some implementations, and in a case where the calculated distance still does not satisfy the threshold (e.g., is not greater than or equal to the predefined distance), notification platform 215 can calculate a distance between a trace point having an index value that precedes the index value (N) of trace point $P_N$ by x*n (where x, here, is further incremented by 1, e.g., x=3) (i.e., a trace point $P_{N-3n}$) and trace point $P_{N+2n}$, determine whether the calculated distance satisfies the threshold (e.g., is greater than or equal to the predefined distance), and so on, until notification platform 215 calculates a distance that satisfies the threshold. The distance can thus be calculated, using indexes (e.g., N−(x*n) and N+(x*n)) associated with trace points of a route trace. In some implementations, the indexes can be restricted to the following condition(s):

$$0<=N-(x*n)<=N+(x*n)<=\text{a total quantity of trace points of a route.}$$

Figure 5A:
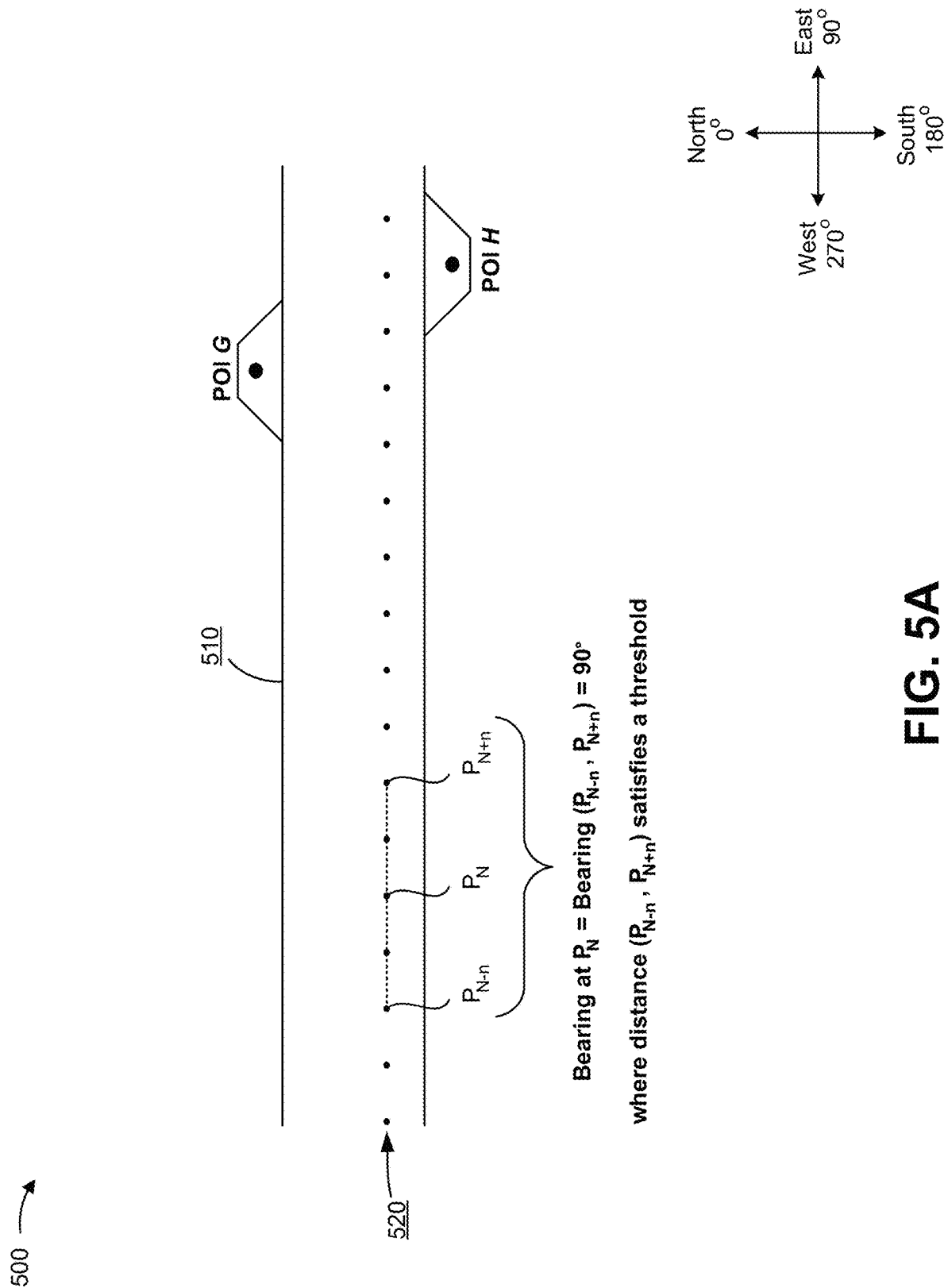
FIGS. 5A-5C are diagrams of example implementations relating to the example process shown in FIG. 4.

In some implementations, and in a case where the notification platform 215 calculates a distance between two trace points that satisfies the threshold (as described above), notification platform 215 can determine a bearing B associated with trace point $P_N$ (e.g., an expected bearing of vehicle 205 at trace point $P_N$). An example implementation is shown in FIG. 5A, and described in more detail below.

In some implementations, notification platform 215 can identify a trace point, of the route trace, that is closest to the POI—the closest trace point. In some implementations, notification platform 215 can determine the closest trace point by selecting a trace point $P_J$ of the route trace, calculating a distance between trace point $P_J$ and the POI, selecting a next trace point $P_{J+1}$, calculating a distance between trace point $P_{J+1}$ and the POI, and so on, until a calculated distance corresponding to one of such trace points is greater than a calculated distance corresponding to an immediately preceding trace point, in which case notification platform 215 can determine that the immediately preceding trace point is the closest trace point.

Figure 5B:
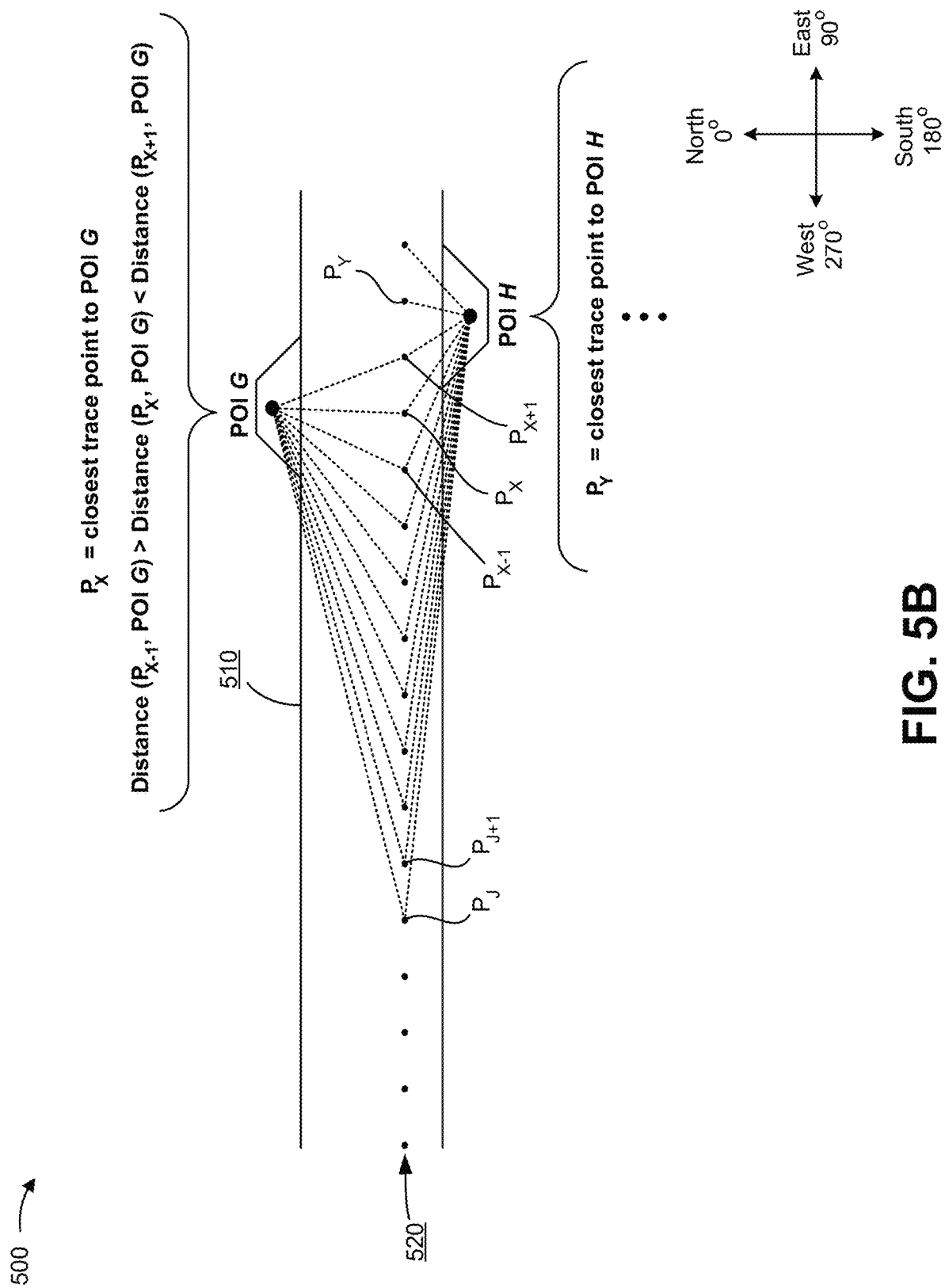

In some implementations, notification platform 215 can determine a side vector for the POI (e.g., if information regarding a side vector is otherwise unavailable) from the closest trace point to the POI, and determine an angle (e.g., a bearing) of the side vector. An example implementation is shown in FIG. 5B, and described in more detail below.

In some implementations, and in a case where notification platform 215 determines a bearing B of the route trace at a trace point that is closest to the POI (e.g., as described above), and determines a side vector, from that closest trace point to the POI, and a bearing of the side vector, notification platform 215 can determine whether the POI is located on the appropriate side of a road included in the route of the vehicle (e.g., vehicle 205) based on bearing B and the bearing of the side vector. In some implementations, and as an example, for geographic regions where vehicles are driven on the right side of two-way roads, notification platform 215 can determine whether the bearing of the side vector is equal to bearing B, is equal to B+180°, or is between B+180° (where B+180° less than or equal to 360°). That is, notification platform 215 can determine whether the bearing of the side vector is, or would be, within a range of visibility, of a driver of the vehicle, defined by [B, B+180°] (or is anywhere from B to B+180°). In a case where notification platform 215 determines that the bearing of the side vector is, or would be, within the range of visibility, notification platform 215 can determine that the POI is located on an appropriate side of the road, and thus satisfies the condition.

Figure 5C:
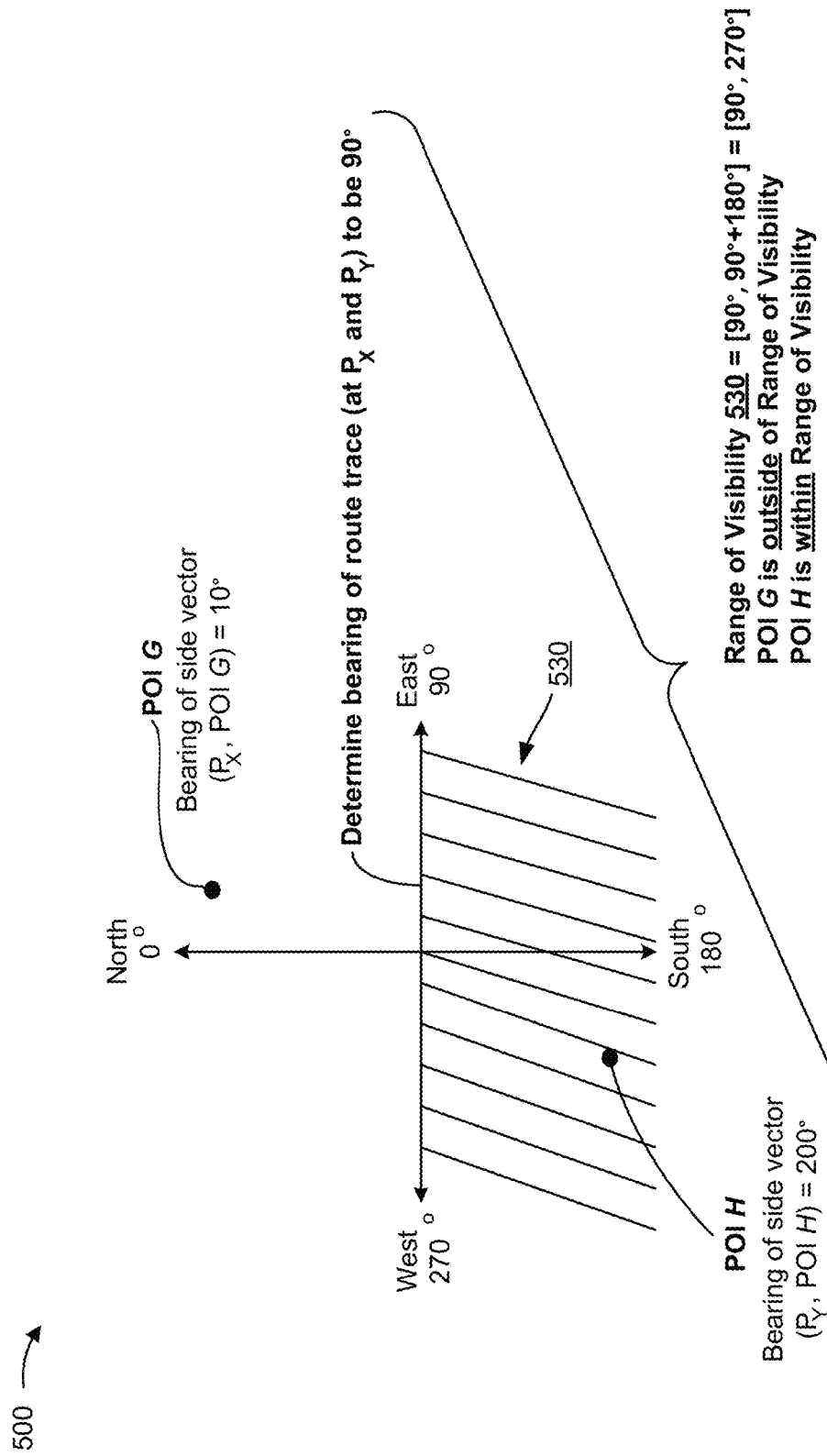

Alternatively, where bearing B+180° is greater than or equal to 360°, notification platform 215 can determine that the POI is located on the appropriate side of the road, and thus satisfies the condition, if the bearing of the side vector is, or would be, within a range of visibility defined by a union of [B, 360°] and [0, B−180°]. An example implementation is shown in FIG. 5C, and described in more detail below.

In this way, notification platform 215 can determine whether the POI satisfies one or more conditions to cause notification platform 215 to perform one or more actions to cause the route information and information regarding the POI to be provided, or perform one or more actions to cause the route information, but not information regarding the POI, to be provided.

As further shown in FIG. 4, if the POI satisfies the one or more conditions (block 430—YES), process 400 can include performing one or more actions to cause the route information and information regarding the POI to be provided (block 440). For example, notification platform 215 can perform (e.g., using processor 320, communication interface 370, and/or the like) one or more actions to cause the route information and the information regarding the POI to be provided. In practice, notification platform 215 can perform thousands, millions, billions, etc. of actions relating to route information and information regarding POIs. In this way, notification platform 215 can perform actions relating to route information and information regarding POIs in a manner that cannot be performed manually or objectively by a human actor.

In some implementations, notification platform 215 can provide the route information and the information regarding the POI to vehicle 205, user device 210 in vehicle 205, and/or the like. For example, notification platform 215 can provide the route information and the information regarding the POI to user device 210 for display to a driver of vehicle 205. In some implementations, user device 210 can present an alert regarding the POI when vehicle 205 is within a threshold distance from the POI. In some implementations, and in a case where vehicle 205 is an autonomous (or semi-autonomous) vehicle, user device 210 can permit a user to select the POI, and can instruct or control vehicle 205 to navigate (e.g., based on the route information, based on information provided by a mapping service, and/or the like) to the POI based on the user's selection.

In this way, notification platform 215 can perform one or more actions to cause the route information and information regarding the POI to be provided.

As further shown in FIG. 4, if the POI does not satisfy the one or more conditions (block 430—NO), process 400 can include performing one or more actions to cause the route information, but not information regarding the POI, to be provided (block 450). For example, notification platform 215 can perform (e.g., using processor 320, communication interface 370, and/or the like) one or more actions to cause the route information, but not information regarding the POI, to be provided. In practice, notification platform 215 can perform thousands, millions, billions, etc. of actions relating to route information. In this way, notification platform 215 can perform actions relating to route information in a manner that cannot be performed manually or objectively by a human actor.

In some implementations, notification platform 215 can provide the route information to vehicle 205, user device 210 in vehicle 205, and/or the like. In some implementations, notification platform 215 can, despite the POI not satisfying the one or more conditions, nevertheless provide information regarding the POI to user device 210 or vehicle 205, but user device 210 or vehicle 205 might not present an alert regarding the POI (e.g., might not present an alert regarding the POI when vehicle 205 is within a threshold distance from the POI).

In this way, notification platform 215 can perform one or more actions to cause the route information, but not information regarding the POI, to be provided.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

FIGS. 5A-5C are diagrams of an example implementation 500 relating to example process 400 shown in FIG. 4. As shown in FIG. 5A, example implementation 500 can include a road 510 included in a route of vehicle 205, a corresponding route trace 520 that includes multiple trace points (e.g., $P_N$, etc.), and two potential POIs—a POI G and a POI H. Here, notification platform 215 can determine a bearing of route trace 520 at one or more trace points, as described elsewhere herein (e.g., with respect to block 430 of FIG. 4). For example, notification platform 215 can determine distances between trace points that precede and follow point $P_N$ (e.g., using the iterative calculation(s), described above with respect to block 430 of FIG. 4, involving the N−(x*n) and N+(x*n) operations relating to indexes of trace points), and determine a bearing of a virtual line between the trace points whose distance therebetween satisfies a threshold. Here, as shown, for example, notification platform 215 can determine that a distance between trace points $P_{N-n}$ and $P_{N+n}$ satisfies the threshold, and that the bearing of a virtual line between such points (and thus the bearing of the route trace at trace point $P_N$) is 90°. Additionally, in some implementations, notification platform 215 can determine a bearing of other (e.g., many other, such as all other) trace points in route trace 520 in the same or a similar manner.

As shown in FIG. 5B, notification platform 215 can identify a trace point that is closest to POI G, and a trace point that is closest to POI H, and utilize such trace points to determine respective side vectors for POI G and POI H. For example, as shown, for POI G, notification platform 215 can identify the trace point that is closest to POI G by determining a distance between the location of POI G and one or more trace points, beginning with a trace point $P_J$, then proceeding to trace point $P_{J+1}$, etc., until three consecutive trace points—here trace points $P_{X-1}$, $P_X$, and $P_{X-1}$ satisfy the condition: Distance ($P_{X-1}$, POI G)>Distance ($P_X$, POI G)<Distance ($P_{X+1}$, POI G). In this case, notification platform 215 can determine that trace point $P_X$ is the closest trace point to POI G, and determine a side vector ($P_X$, POI G) for POI G. Additionally, notification platform 215 can identify a trace point $P_Y$ as being closest to POI H, and determine a side vector ($P_Y$, POI H) for POI H, in the same or a similar manner.

As shown in FIG. 5C, notification platform 215 can determine the bearing of route trace 520, at trace points $P_X$ and $P_Y$, to be 90°. In some implementations, notification platform 215 can determine the bearing of route trace 520 using the iterative calculations described above with respect to FIG. 5A. As shown by reference number 530, notification platform 215 can define a range of visibility of a driver based on the bearing of route trace 520 at trace point $P_X$, and a range of visibility of a driver based on the bearing of route trace 520 at trace point $P_Y$. Here, since the bearing of route trace 520 is the same at trace points $P_X$ and $P_Y$, the range of visibility is the same—i.e., [90°, 270°] (e.g., based on the range [B, B+180°] described above with respect to block 430 of FIG. 4). Additionally, notification platform 215 can determine whether the bearing of side vector ($P_X$, POI G) and the bearing of side vector ($P_Y$, POI H) fall within the range of visibility. Here, notification platform 215 can determine that POI G (with a side vector bearing of 10°) is not within the range of visibility, and that POI H (with a side vector bearing of 200°) is, or would be, within the range of visibility. In this case, for example, notification platform 215 can determine POI H (but not POI G) to be a relevant POI, and can (e.g., assuming that POI H is also easily/quickly reachable from road 510) provide information regarding POI H (and not POI G) to user device 210 and/or vehicle 205.

As indicated above, FIGS. 5A-5C are provided merely as examples. Other examples are possible and can differ from what was described with regard to FIGS. 5A-5C.

Some implementations, described herein, include a notification platform 215 that is capable of determining whether a POI, located along or near a route of a vehicle, satisfies one or more conditions (e.g., is easily/quickly reachable from the route and is, or would be, within a range of visibility of a driver of the vehicle), and providing information regarding the POI (e.g., for display to the driver) if the POI satisfies the condition(s). In this way, a navigation service provider can avoid providing, to a driver, information regarding a POI that might be irrelevant to the driver or that might take an unreasonable amount of time to reach (or involve an unreasonable driving distance to reach) from the route of the vehicle, which conserves communication resources of the device, reduces or eliminates a need for an in-vehicle navigation device to store and process information regarding such a POI (which conserves processing and memory resources of the navigation device), and conserves energy (e.g., fuel) that would otherwise need to be expended to reach a POI that is a significant driving distance away from the route. Additionally, this reduces a quantity of alerts provided to a driver, which reduces a quantity of distractions to the driver, permitting the driver to be more focused on the road (thereby improving the safety of the driver and others on the road).

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Certain user interfaces have been described herein and/or shown in the figures. A user interface can include a graphical user interface, a non-graphical user interface, a text-based user interface, and/or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
      determine route information associated with a route of a vehicle based on location information associated with a current location of the vehicle;
      identify a point of interest (POI) based on the route information;
      identify a portion, of the route of the vehicle, that has a shortest distance to the POI;
      determine one or more paths from the POI;
      determine whether the portion of the route is included in an initial portion of a path, of the one or more paths, after determining the one or more paths;
      determine whether the POI is located on a right side of or to a right of the portion of the route, relative to a direction of travel of the vehicle on the portion of the route; and
      display, by a user device associated with the vehicle, the route information and information regarding the POI while the vehicle is traveling along or near the route when:
         the portion of the route is included in the initial portion of the path, and
         the POI is located on the right side of or to the right of the portion of the route, relative to the direction of travel of the vehicle; and
      display, by the user device, the route information while the vehicle is traveling along or near the route without displaying the information regarding the POI when:
         the portion of the route is not included in the initial portion of the path, or
         the POI is not located on the right side of or to the right of the portion of the route, relative to the direction of travel of the vehicle.

2. The device of claim 1, wherein the portion of the route is a road segment of a road included in the route;
   wherein the initial portion of the path includes an initial set of road segments of one or more roads; and
   wherein the one or more processors, when determining whether the portion of the route is included in the initial portion of the path, are to:

determine whether the road segment is included in the initial set of road segments.

3. The device of claim 1, wherein the one or more processors are further to:
determine a route trace, of the route of the vehicle, that includes a plurality of trace points; and
wherein the one or more processors, when determining whether the POI is located on the right side of or to the right of the portion of the route, are to:
determine whether the POI is located on the right side of or to the right of the portion of the route based on one or more calculations involving multiple trace points of the plurality of trace points.

4. The device of claim 1, wherein the one or more processors are further to:
determine a route trace, of the route of the vehicle, that includes a plurality of trace points; and
identify a trace point of the plurality of trace points that has a shortest distance to the POI; and
wherein the one or more processors, when determining whether the POI is located on the right side of or to the right of the portion of the route, are to:
determine whether the POI is located on the right side of or to the right of the portion of the route based on one or more calculations involving the trace point.

5. The device of claim 1, wherein the one or more processors are further to:
determine a route trace, of the route of the vehicle, that includes a plurality of trace points;
identify a trace point of the plurality of trace points that has a shortest distance to the POI; and
determine a bearing of the route trace at the trace point; and
wherein the one or more processors, when determining whether the POI is located on the right side of or to the right of the portion of the route, are to
determine whether the POI is located on the right side of or to the right of the portion of the route based on the bearing.

6. The device of claim 1, wherein the one or more processors are further to:
identify two trace points, of a plurality of trace points corresponding to the route of the vehicle, in which a distance between the two trace points satisfies a threshold; and
determine a bearing, associated with a trace point that is between the two trace points, based on the distance; and
wherein the one or more processors, when determining whether the POI is located on the right side of or to the right of the portion of the route, are to
determine whether the POI is located on the right side of or to the right of the portion of the route based on the bearing.

7. A non-transitory computer-readable medium storing instructions, the instructions comprising:
one or more instructions that, when executed by one or more processors, cause the one or more processors to:
determine route information associated with a route of a vehicle based on location information associated with a current location of the vehicle;
identify a point of interest (POI) based on the route information;
identify a portion, of the route of the vehicle, that has a shortest distance to the POI;
determine one or more paths from the POI;

determine whether the portion of the route is included in an initial portion of a path, of the one or more paths, after determining the one or more paths;
determine whether the POI is located on a right side of or to a right of the portion of the route, relative to a direction of travel of the vehicle on the portion of the route;
display, by a user device associated with the vehicle, the route information and information regarding the POI while the vehicle is traveling along or near the route when:
the portion of the route is included in the initial portion of the path, and
the POI is located on the right side of or to the right of the portion of the route, relative to the direction of travel of the vehicle; and
display, by the user device, the route information while the vehicle is traveling along or near the route without displaying the information regarding the POI when:
the portion of the route is not included in the initial portion of the path, or
the POI is not located on the right side of or to the right of the portion of the route, relative to the direction of travel of the vehicle.

8. The non-transitory computer-readable medium of claim 7, wherein the portion of the route is a road segment of a road included in the route;
wherein the initial portion of the path includes an initial set of road segments of one or more roads; and
wherein the one or more instructions, that cause the one or more processors to determine whether the portion of the route is included in the initial portion of the path, cause the one or more processors to:
determine whether the road segment is included in the initial set of road segments.

9. The non-transitory computer-readable medium of claim 7, wherein the one or more instructions, when executed by the one or more processors, further cause the one or more processors to:
determine a route trace, of the route of the vehicle, that includes a plurality of trace points; and
wherein the one or more instructions, that cause the one or more processors to determine whether the POI is located on the right side of or to the right of the portion of the route, cause the one or more processors to:
determine whether the POI is located on the right side of or to the right of the portion of the route based on one or more calculations involving multiple trace points of the plurality of trace points.

10. The non-transitory computer-readable medium of claim 7, wherein the one or more instructions, when executed by the one or more processors, further cause the one or more processors to:
determine a route trace, of the route of the vehicle, that includes a plurality of trace points; and
identify a trace point of the plurality of trace points that has a shortest distance to the POI; and
wherein the one or more instructions, that cause the one or more processors to determine whether the POI is located on the right side of or to the right of the portion of the route, cause the one or more processors to:
determine whether the POI is located on the right side of or to the right of the portion of the route based on one or more calculations involving the trace point.

11. The non-transitory computer-readable medium of claim 7, wherein the one or more instructions, when executed by the one or more processors, further cause the one or more processors to:
- determine a route trace, of the route of the vehicle, that includes a plurality of trace points;
- identify a trace point of the plurality of trace points that has a shortest distance to the POI; and
- determine a bearing of the route trace at the trace point; and wherein the one or more instructions, that cause the one or more processors to determine whether the POI is located on the right side of or to the right of the portion of the route, cause the one or more processors to:
- determine whether the POI is located on the right side of or to the right of the portion of the route based on the bearing.

12. The non-transitory computer-readable medium of claim 7, wherein the one or more instructions, when executed by the one or more processors, further cause the one or more processors to:
- identify two trace points, of a plurality of trace points corresponding to the route of the vehicle, in which a distance between the two trace points satisfies a threshold; and
- determine a bearing, associated with a trace point that is between the two trace points, based on the distance; and wherein the one or more instructions, that cause the one or more processors to determine whether the POI is located on the right side of or to the right of the portion of the route, cause the one or more processors to:
- determine whether the POI is located on the right side of or to the right of the portion of the route based on the bearing.

13. A method, comprising:
- determining, by a device, route information associated with a route of a vehicle based on location information associated with a current location of the vehicle,
- identifying, by the device, a point of interest (POI) based on the route information;
- identifying, by the device, a portion, of the route of the vehicle, that has a shortest distance to the POI;
- determining, by the device, one or more paths from the POI;
- determining, by the device, whether the portion of the route is included in an initial portion of a path, of the one or more paths, after determining the one or more paths;
- determining, by the device, whether the POI is located on a right side of or to a right of the portion of the route, relative to a direction of travel of the vehicle on the portion of the route;
- displaying, by a user device associated with the vehicle, the route information and information regarding the POI while the vehicle is traveling along or near the route when:
  - the portion of the route is included in the initial portion of the path, and
  - the POI is located on the right side of or to the right of the portion of the route, relative to the direction of travel of the vehicle; and
- displaying, by the user device, the route information while the vehicle is traveling along or near the route without displaying the information regarding the POI when:
  - the portion of the route is not included in the initial portion of the path, or
  - the POI is not located on the right side of or to the right of the portion of the route, relative to the direction of travel of the vehicle.

14. The method of claim 13, wherein the portion of the route is a road segment of a road included in the route;
- wherein the initial portion of the path includes an initial set of road segments of one or more roads; and
- wherein determining whether the portion of the route is included in the initial portion of the path comprises:
  - determining whether the road segment is included in the initial set of road segments.

15. The method of claim 13, further comprising:
- determining a route trace, of the route of the vehicle, that includes a plurality of trace points; and
- wherein determining whether the POI is located on the right side of or to the right of the portion of the route comprises:
  - determining whether the POI is located on the right side of or to the right of the portion of the route based on one or more calculations involving multiple trace points of the plurality of trace points.

16. The method of claim 13, further comprising:
- determining a route trace, of the route of the vehicle, that includes a plurality of trace points; and
- identifying a trace point of the plurality of trace points that has a shortest distance to the POI; and
- wherein determining whether the POI is located on the right side of or to the right of the portion of the route comprises:
  - determining whether the POI is located on the right side of or to the right of the portion of the route based on one or more calculations involving the trace point.

17. The method of claim 13, further comprising:
- determining a route trace, of the route of the vehicle, that includes a plurality of trace points;
- identifying a trace point of the plurality of trace points that has a shortest distance to the POI; and
- determining a bearing of the route trace at the trace point; and
- wherein determining whether the POI is located on the right side of or to the right of the portion of the route comprises:
  - determining whether the POI is located on the right side of or to the right of the portion of the route based on the bearing.

18. The device of claim 1, wherein the one or more processors are further to:
- detect a change in the direction of travel of the vehicle on the portion of the route; and
- update the route information based on detecting the change in the direction of travel.

19. The non-transitory computer-readable medium of claim 7, wherein the one or more instructions, when executed by the one or more processors, further cause the one or more processors to:
- detect a change in the direction of travel of the vehicle on the portion of the route; and
- update the route information based on detecting the change in the direction of travel.

20. The method of claim 13, further comprising:
- detecting a change in the direction of travel of the vehicle on the portion of the route; and
- updating the route information based on detecting the change in the direction of travel.

* * * * *